Figure 1:
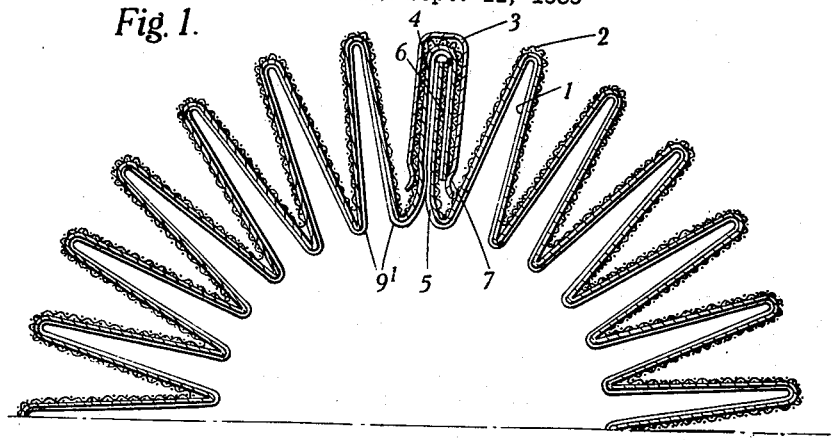

April 14, 1942.  C. G. VOKES  2,279,423
FILTER
Filed Sept. 11, 1939

INVENTOR
Cecil G. Vokes
BY
ATTORNEY

Patented Apr. 14, 1942

2,279,423

UNITED STATES PATENT OFFICE 2,279,423

FILTER

Cecil Gordon Vokes, London, England

Application September 11, 1939, Serial No. 294,398
In Great Britain September 23, 1938

5 Claims. (Cl. 210—169)

This invention relates to filter elements of the kind which are arranged to form a closed figure in cross-section, usually a star-shaped figure, when in condition for use and to filters and filter units including such elements.

Filter elements of this kind often comprise one or more layers of filtering material combined with one or more layers of reinforcing material, such as wire gauze.

In connection with star-shaped and other pleated or pocketed filtering elements for use in the filtering of air, oil and other fluids, I find it advantageous to arrange the inside angles or bends of the corrugations or pleats of the element closely adjacent to each other in order to get the largest possible filter area in a given space.

I now find that these bends can be made practically to touch without producing excessive back pressure in a filter of normal proportions. The result of this close spacing is that cleaning of the element in the condition for use is even more difficult than in the case of filters with normally spaced pleats.

It is an object of the invention to facilitate the cleaning of such elements, for which purpose I secure the ends of the filtering material detachably together; a feature of the invention is the securing together of the ends of a filter element by means of one or more clips of metal or other suitable material. The clip or clips may be easily removed to enable the material of the filter element to be opened out for cleaning.

A further object of the invention is to provide a filter or filter unit including a filter element which is compressed, for example by insertion in a casing of reticulated material, to increase the closeness of its pleats, and it is a still further object to prevent the adjacent pleats actually touching each other, when the element is compressed, all the way along the inside bends, by the provision of suitable spacing means.

With the above and other objects in view, the invention consists in the improved combinations and arrangements contained in the embodiments now to be described in detail, and features of which are set out in the claims which follow.

In the drawing—

Figure 2:
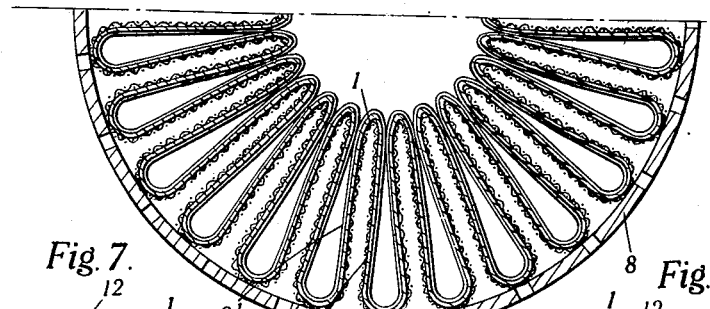
Figure 7:
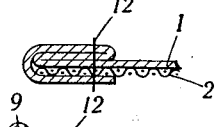
Figure 3:
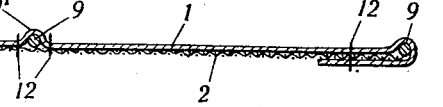
Figure 8:
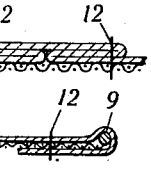

Figure 1 represents a cross-section through one half of the filter element before insertion in its immediate casing, Figure 2 represents a similar cross-section through the other half of the element after insertion in the casing, Figure 3 is a section in a plane at right angles to those of Figs. 1 and 2, and Figures 4 to 8 illustrate alternative modifications of detail which may be applied to the element illustrated in the preceding figures.

The filter element illustrated comprises pleated layers of filtering cloth 1 and wire gauze 2 with the ends secured together by means of a metal clip 3 of substantially U-shaped cross-section to form a closed figure of star-shape with the cloth on the inside. Near their free ends, the arms of the clip have inwardly projecting gripping portions 7.

It will be seen that the joint is formed by the clamping together of portions 4 and 5 which extend outwardly from the centre of the star formation and a portion 6 which forms a continuation of the portion 4 and is folded round the portion 5: the abutment of the portions 4 and 5 provides a fabric to fabric joint, giving a good oil-tight connection.

As will be seen from the drawing, the pleating of the element is carried out so that sharp angular bends, which come on the inside of the star-shaped formation, alternate with curved bends which are situated on the outside.

When putting an element as just described into use in the preferred manner, the pleats are caused to approach each other more closely by inserting the element within a cylindrical casing 8 of relatively small diameter and having walls of perforated metal. The filter unit thus formed, which is intended for the filtration of oil from the inside to the outside, may conveniently be arranged within an outer casing so as to move as a whole to provide a by-pass when the back-pressure is increased by clogging of the element.

In order to prevent too great a resistance to the passage of oil through the filter screen, spacing means are provided to prevent the adjacent folds of cloth 1 being pressed too tightly together, especially at the inner angles, when the element is compressed within the casing. As shown in Figure 3, lengths of lead wire 9 are interposed between the layers of cloth and gauze and held in position by stitching applied before the pleating operation.

The stitching 12 which locates the two outer lengths of wire also serves to secure the turned-over edges of the filter cloth 1 by which the edges of the gauze 2 are bound.

A ridge 9' in the filter cloth due to the presence of one of the wires 9 appears in the sections of Figs. 1 and 2 and it will be seen from Fig. 2 that the ridges come together at the inner angles when the element is compressed, the intermediate portions of fabric being spaced apart.

Spacing of the adjacent folds of filtering material may be provided for otherwise than in the manner illustrated. Thus, for example, the arrangement illustrated—namely, the outward folding of the cloth at the edges to space the gauze and the use of wire to space the cloth—might be reversed, or ridges 13 might be formed by appropriate swaging or other deformation of the gauze. Again, the cloth which is folded over the edges of the gauze in the arrangement illustrated might be doubled back upon itself to provide spacing of both the gauze and cloth faces as in Figs. 7 or 8.

A clip for securing the ends of a filter element to preserve a star-shaped formation could be used in situations other than that just described, for example to clamp together end portions which project radially outwardly from the center of the formation, the equivalent of the folded-over portion 6 being omitted. Again, the clip (or clips) may co-operate with inwardly extending portions of the filter element, which are preferably shorter than those portions which form the points of the star, so that the clip though situated within the closed figure defined by the element is to the outside of the central substantially cylindrical space within the element where freedom of passage for the fluid under treatment is important.

Figure 4:
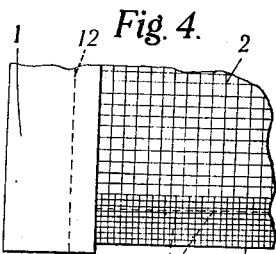
Figure 6:
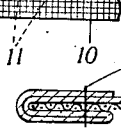

Figure 4 illustrates a feature which is not actually shown in Figs. 1 and 2 but may be desirable in many cases. As illustrated, the ends of the wire gauze 2 between the turned-over portions of the cloth 1 are bound by means of strips 10 of fine wire gauze secured by stitching 11, which may also serve to secure the filter cloth 1 to the gauze 2. The avoidance of rough edges, which may if desired be effected in any other suitable manner, for example by binding with metal foil instead of with gauze, facilitates the joining together of the ends of the element, especially in cases where the clip is slipped directly over the actual end portions of the element, there being no bent-over portion equivalent to the portion 6 in Figure 1.

Figure 5:
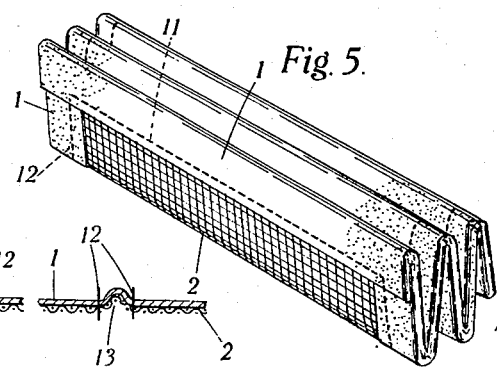

Figure 5 illustrates an arrangement alternative to that of Figure 4 and in which the cloth is made longer than the gauze and folded over the ends of the latter to take the place of the foil or fine gauze of Figure 4.

In the form illustrated, the filter element comprises a pair of ends detachably secured together. If desired, the element might comprise a plurality of sections, the ends of each section being detachably secured to those of the adjacent section or sections.

Although the ready release of the ends of a filter element to enable the latter to be opened out for cleaning is of particular advantage in the case of an element through which filtration takes place from the inside to the outside of the closed figure defined by the element, as in the particular example described above, it also facilitates cleaning in the case of an element through which filtration takes place from the outside to the inside.

The invention is not limited to its application to filter elements of star-shaped formation and may be applied to filter elements in which other formations are preserved.

I claim:

1. A filter to pass liquid from inside to outside a space wholly within a filtering unit, the filtering unit comprising a filtering screen made up of attached layers of filtering material and resiliently reinforcing material, the filtering screen being bent with the filtering material inside to form a closed figure having pockets projecting from a center space within the figure, a foraminous enclosure enclosing and compressing the screen, and spacing means at the entry to each pocket from the central space, the said spacing means serving to preserve an opening to permit unfiltered fluid entering the pockets from the central space.

2. A construction as defined in claim 1 wherein the spacing means is arranged between the layers of the screen and held by stitching on each side of the spacing means to form a longitudinally extending rib, and further providing to insure the attachment of the filtering material to the reinforcing material.

3. A construction as defined in claim 1 wherein the spacing means is provided by folding the filtering material back upon itself and securing it in position to form a longitudinally extending rib of at least one thickness of filtering material upon the filtering material side of the screen.

4. A zig-zag filtering screen of attached layers of filtering material and reinforcing material, the said screen being bent around to form a closed figure, with the filtering material inside, the junction of the ends of the screen being formed with the filtering material side of the screen at the ends pressed into actual contact, and a removable clip to maintain such contact.

5. A filter to filter fluid passing outwardly from a space wholly within the filtering unit, said filter unit comprising a filtering screen formed as a closed figure and made up of attached layers of filtering material and resilient reinforcing material, the figure being of zig-zag deeply pleated form, with the filtering material inside the figure, spacing means projecting from the filtering material inside the figure and running transversely to the bends and a foraminated casing enclosing and compressing the screen to bring the spacing means into contact near the bends at the roots of the pleats, whereby the spacing means serves to set the opening for unfiltered fluid to enter between adjacent bends of the form.

CECIL G. VOKES.